(12) United States Patent
Indukuri (10) Patent No.: US 10,068,006 B1
(45) Date of Patent: Sep. 4, 2018

(54) GENERATING TREND-BASED ITEM RECOMMENDATIONS

(75) Inventor: Kiran Kumar Indukuri, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1173 days.

(21) Appl. No.: 13/315,971

(22) Filed: Dec. 9, 2011

(51) Int. Cl.
*G06F 17/30* (2006.01)

(52) U.S. Cl.
CPC .... *G06F 17/3064* (2013.01); *G06F 17/30867* (2013.01)

(58) Field of Classification Search
CPC .................................................. G06F 17/3053
USPC .......................................................... 707/767
See application file for complete search history.

(56) References Cited

U.S. PATENT DOCUMENTS

| | | | |
|---|---|---|---|
| 2002/0019763 A1* | 2/2002 | Linden et al. | 705/10 |
| 2005/0091118 A1* | 4/2005 | Fano | 705/26 |
| 2006/0241859 A1* | 10/2006 | Kimchi et al. | 701/208 |
| 2007/0094042 A1* | 4/2007 | Ramer | G06F 17/30867 705/1.1 |
| 2008/0162304 A1* | 7/2008 | Ourega | 705/27 |
| 2009/0299818 A1* | 12/2009 | Heinze et al. | 705/10 |
| 2010/0121843 A1* | 5/2010 | Goeldi | G06Q 10/00 707/722 |
| 2010/0205541 A1* | 8/2010 | Rapaport et al. | 715/753 |
| 2011/0282700 A1* | 11/2011 | Cockcroft | 705/5 |
| 2011/0320715 A1* | 12/2011 | Ickman et al. | 711/118 |

* cited by examiner

*Primary Examiner* — Mariela Reyes
*Assistant Examiner* — Courtney Harmon
(74) *Attorney, Agent, or Firm* — Thomas Horstemeyer, LLP (57) ABSTRACT

Disclosed are various embodiments for generating recommendations for one or more items related to a topic of interest. In one embodiment, one or more items are identified that are related to one or more topics of ephemeral interest. A subset of the identified items may be selected to recommend to a plurality of users. One or more users may then be sent a notification comprising the recommendations for one or more of the items in the subset.

20 Claims, 7 Drawing Sheets

GENERATING TREND-BASED ITEM RECOMMENDATIONS

BACKGROUND

Certain topics or events, such as, natural disasters or new clothing styles, capture the attention of people for a limited span of time. A variety of items may be associated with such events or topics, such as, books on disaster relief and trendy articles of clothing.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments of the present disclosure relate to generating recommendations for items related to one or more topics of interest. For instance, identifying one or more topics of interest and determining items that are related to the topics of interest may be beneficial to a seller because such items may be more in demand by customers. To this end, in one embodiment, the content of various network sites may be analyzed to determine one or more topics of interest. For each of the topics of interest, one or more items related to the topic may be selected to present as a recommendation to a user. In another embodiment, recommendations for one or more items may be based upon one or more topics of interest associated with a target geography selected by a user. To this end, the topics of interest associated with the target geography may be identified, and one or more items related to those topics may be recommended for purchase to the user. In the following discussion, a general description of the system and its components is provided, followed by a discussion of the operation of the same.

Figure 1:
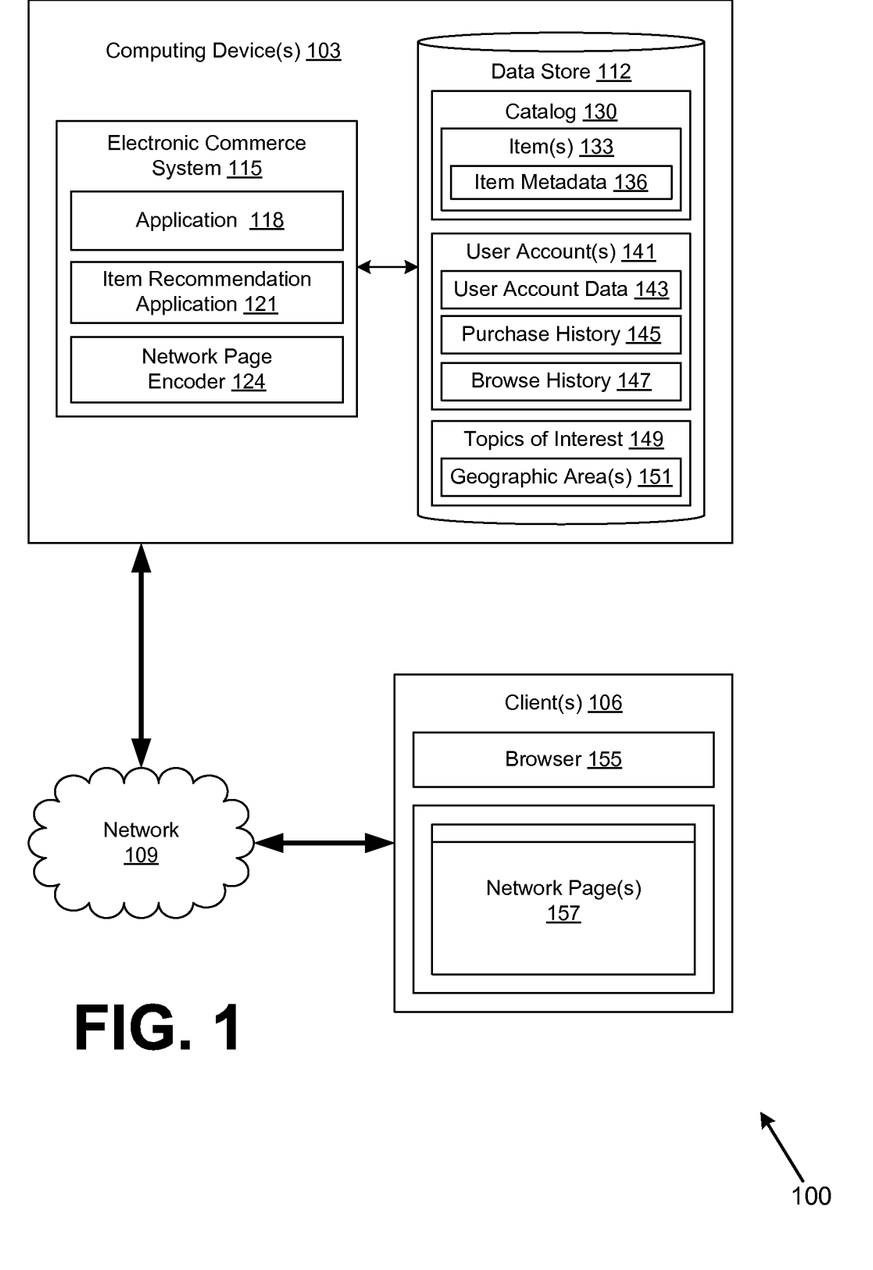
FIG. 1 is a drawing of a networked environment according to various embodiments of the present disclosure.

With reference to FIG. 1, shown is a networked environment 100 according to various embodiments. The networked environment 100 includes a computing device 103, a client 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include an electronic commerce system 115 and other applications, services, processes, systems, engines, or functionality not discussed in detail herein. The electronic commerce system 115 may include various components, such as, a topics recommendation application 118, an item recommendation application 121, a network page encoder 124, and potentially other applications and/or processes.

The electronic commerce system 115 is executed in order to facilitate the online purchase of items over the network 109. The electronic commerce system 115 also performs various back-end functions associated with the online presence of a merchant in order to facilitate the online purchase of items. For example, the electronic commerce system 115 may generate various network pages 157, using the network page encoder 124, such as web pages or other types of network content that are provided to clients 106 for the purposes of selecting items for purchase, rental, download, lease, or any other forms of consumption as can be appreciated. Alternatively, a mobile application may be executed in a client 106 to generate and render user interfaces using data served up by the computing device 103 and/or other servers. To this end, when rendered, network pages 157 generate a user interface as can be appreciated.

The application 118 is executed to analyze online content, such as, for example, user sourced content on various network sites and determines one or more topics of interest as will be described. In another embodiment, the application 118 may be configured to gather additional data for each of the topics of interest as will be described.

The item recommendation application 121 is executed to generate recommendations for items related to one or more topics of interest identified by the application 118. In another embodiment, the item recommendation application 121 may be configured to generate recommendations for items based upon data associated with one or more users, one or more items, and potentially other data as will be described.

The data stored in the data store 112 includes, for example, a catalog 130 of items 133, user accounts 141, topics of interest 149, and potentially other data. Associated with each of the items 133 is item metadata 136, and potentially other data. The item metadata 136 comprises information about each of the items 133 in the catalog 130 useful in searching the items 133, such as, for example, item titles, item images, item descriptions, item prices, item categories, and potentially other data.

Associated with each user account 141 is, for example, user account data 143, a purchase history 145, a browse history 147, and potentially other data associated with a user. The user account data 143 may include information about a user and their user account 141, such as, for example, name, address, payment instruments, billing information, account settings, passwords, security credentials, and geographical data associated with the user, and potentially other data. The purchase history 145 may include data related to a history of items 133 purchased through the electronic commerce system 115 by the user. The browse history 147 may comprise data that relates to a history of browsing for items 133 by the user through the electronic commerce system 115.

The topics of interest 149 comprise one or more topics or events associated with a high level of public interest. Each of the topics of interest 149 may be associated with one or more geographic areas 151, and potentially other data. The geographic areas 151 may comprise information about one or more geographical locations related to each of the topics of interest 149, such as, for example, a listing of geographical regions, zip codes, counties, cities, and/or any other indicators of geographical areas as can be appreciated.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a browser 155 and/or other applications, such as, for example, email applications, instant message applications, and/or other applications. The browser 155 may be executed in a client 106, for example, to access and render network pages 157, such as web pages, or other network content served up by the computing device 103 and/or other servers. Alternatively, a mobile application may be executed in a client 106 to generate and render user interfaces using data served up by the computing device 103 and/or other servers. To this end, when rendered, network pages 157 generate a user interface as can be appreciated.

Next, a general description of the operation of the various components of the networked environment 100 is provided. To begin, the application 118 identifies online content within a predetermined period of time, such as, for instance, postings by users on social networking sites within the last seven days or news stories on one or more news network sites within the last twenty-four hours. The application 118 may then analyze the terms and concepts included in such content to identify one or more topics of interest 149. For instance, the application 118 may identify a topic of interest 149 if the frequency and occurrence of these terms meets a predefined threshold. In one embodiment, the predefined threshold may vary depending on the type of source being used to identify a topic of interest 149.

As a non-limiting example, assume the application 118 may be configured to analyze terms and phrases in postings on a social networking site, such as, for instance, Twitter®, where the predetermined period of time is the last seven days, and where the predefined threshold is five-hundred. Further assume that the sentence "watching the world series!", or a similar variation thereof that includes the phrase "world series", has been recently posted by over seven-hundred users on Twitter® within the last seven days. In this example, the application 118 may parse each of these postings and identify "World Series" as a topic of interest 149 currently associated with a high level of public interest.

Additionally, the application 118 may be configured to detect whether a topic of interest 149 is increasing and/or decreasing in popularity by comparing a level of interest expressed by users at different point in time. For instance, in the example above, assume that the "World Series" topic of interest 149 appeared in 10,000 Twitter® postings generated by users. Further assume that, after a period of time, the "World Series" topic of interest 149 appeared in 20,000 Twitter® postings generated by users. In this case, the system 115 may determine that the "World Series" topic of interest 149 is increasing in popularity because the level of interest expressed by Twitter® users is increasing.

Further, the application 118 may be configured to generate a notification to, for instance, a supplier if a topic of interest 149 is increasing or decreasing in popularity. To this end, the notification may put the supplier on notice that the demand for one or more items 133 relating to the topic interest 149 may increase or decrease accordingly. For instance, upon receiving a notification that a topic of interest 149 is increasing in popularity, a supplier may prepare its warehouses for a possible surge in demand of the items 133 associated with the topic of interest 149.

In another non-limiting example, upon receiving a notification that a topic of interest 149 may be or soon will be increasing in popularity, a supplier may increase the supply of one or more items 133 relating to the topic of interest 149 at one or more fulfillment centers or retail locations. In one embodiment, the supplier may increase the supply of such items 133 at a fulfillment center or retail location that is, for instance, proximate to a location associated with the topic of interest 149.

In another embodiment, the application 118 may be configured to identify one or more topics of interest 149 by evaluating popular search terms input by users into various search engines within a predetermined period of time and associated with a predefined threshold. As a non-limiting example, assume that a search term comprises the words "presidential debate" has been input by thousands of users within the last week. In this example, the application 118 may identify "Presidential Debate" as a topic of interest 149.

In yet another embodiment, the application 118 may be configured to identify one or more topics of interest 149 from a listing of the most popular news events identified by one or more news network sites within a predefined period of time. As a non-limiting example, suppose a news network site comprises a list of the day's most popular current events that are associated with a high level of media coverage and/or public attention. In this example, the application 118 may identify one or more topics of interest 149 from the list of popular events identified by new network sites.

Additionally, the application 118 may use various metrics to identify a topic of interest 149, such as, for instance, monetary values. As a non-limiting example, suppose a network site comprises a list of movies playing in movie theatres and the amount of money each movie has earned at the box office. In this example, the application 118 may identify a movie associated with the highest earnings as a topic of interest 149.

Further, in another embodiment, the application 118 may be configured to identify one or more topics of interest 149 based upon an individual's interest in certain topics. For instance, assume that a user's browsing history 147 indicates that the user is viewing various items 133 and/or network pages 157 relating to a particular subject matter. In this example, the application 118 may identify such subject matter as a topic of interest 149 associated with that particular user.

In addition to identifying one or more topics of interest 129, the application 118 may further identify one or more geographic areas 151 associated with each of the identified topics of interest 149. In one embodiment, the application 118 may be configured to search the subject matter of network sites associated with a topic of interest 149 in order to identify one or more geographic indicators, such as, for example, a listing of geographic areas, zip codes, countries, cities and/or any other indicator. For instance, the subject matter of a network site associated with a topic of interest 149 may reference New Orleans, La. To this end, the application 118 may identify New Orleans, or the entire state of Louisiana as the geographical area 151 associated with this topic of interest 149. In another embodiment, the application 118 may identify one or more geographical areas 151 related to a topic of interest 149 from a listing, a database, a look-up table, and/or some other indicator.

Upon identifying one or more topics of interest 149 and/or geographical areas 151 associated with each of the topics of interest 149, the item recommendation application 121 may identify items 133 related to each of the topics of interest 149. To do so, the item recommendation application 121 identifies one or more items 133 associated with a topic of interest 149 based at least in part upon identifying correlations between one or more terms associated with a topic of interest and one or more keywords associated with each of the items 133. For instance, the item recommendation application 121 may extract one or more terms from a topic of interest 149. As a non-limiting example, suppose the application 118 has identified "Seattle Mariners Win World Series" as a topic of interest 149. In this example, the item recommendation application 121 may extract the terms "Seattle", "Mariners" and/or "World Series" in order to identify items 133 associated with this topic of interest 129.

In another embodiment, the item recommendation application 121 may identify one or more items 133 related to a topic of interest 149 from a listing, a database, a look-up table, and/or any data structure that indicates a correlation between an item 133 and a topic of interest 149. To this end, in the example above, the item recommendation application 121 may identify items 133 related to the Mariners and/or World Series, such as, books on the Mariners, DVDs on the World Series, Mariners t-shirts, and/or other items 133 that are related to this topic of interest 149.

In one embodiment, the item recommendation application 121 may also identify secondary items that are associated with a topic of interest 149. For instance, using the example above, the item recommendation application 121 may identify binoculars for watching baseball games, or a folding table and chairs for tailgating as secondary items associated with the "Seattle Mariners Win World Series" topic of interest 149.

Upon identifying items 133 related to a topic of interest 149, the item recommendation application 121 may select a subset of the items 133 associated with the topic of interest 149 to present as item recommendations to one or more users based upon, for example, data associated with each of the items 133, such as, sales data, customer reviews, and potentially any other relevant information. For example, the item recommendation application 121 may select three of the items 133 related to a topic of interest 149 having the highest number of sales to present as item recommendations to one or more users.

In another embodiment, the item recommendation application 121 may select the items 133 related to a topic of interest 149 based upon information associated with a user, such as, for example, a purchase history 145, a browse history 147, and the like. For instance, assume that the items 133 associated with a topic of interest 149 include paperback books and electronic books. In this example, if a user has previously purchased an electronic book reader, such as, a KINDLE™, then the item recommendation application 121 may present the electronic books instead of the paperback books to recommend to the user.

Thereafter, the item recommendation application 121 may generate item recommendations for the selected items 133. The item recommendation application 121 communicates these recommendations to one or more users in a variety of ways. For example, the item recommendation application 121 may post recommendations for the items 133 on one or more network sites, such as, for example, a social networking site. In another embodiment, the item recommendation application 121 may transmit a notification to one or more users that include the recommendations via an electronic communication, such as, for instance, email, text message, social networking message, an automated phone message, or any other form of electronic communication as can be appreciated.

In one embodiment, the item recommendation application 121 may implement various promotions for each of the items 133 presented as item recommendations based upon, for instance, whether the topic of interest 149 is increasing or decreasing in popularity. For instance, suppose that the application 118 has identified the movie "Twilight" as a topic of interest 149 that is decreasing in popularity. In this example, the item recommendation application 121 may decrease the price for each of the recommended items 133 relating to the Twilight movie. To this end, as a topic of interest 149 decreases in popularity, the item recommendation application 121 may facilitate selling more of the items 133 relating to the topic of interest 149 in order to, for instance, prevent excess inventory.

As described above, the item recommendation application 121 may provide one or more recommendations for items 133 relating to a topic of interest 149 to one or more users. In some cases, a user may send a request to the electronic commerce system 115 for topics of interest 149 associated with target geography. Upon receiving the target geography, the item recommendation application 121 may identify one or more geographic areas 151 that fall within the target geography.

In one embodiment, a user of a client 106 may optionally indicate a target geography on a map, in a listing, and/or indicate one or more geographical areas 151 in any other way. In another embodiment, one or more geographic areas 151 within a target geography are stored on a map, in a look-up table, a database, and/or any other way. As a non-limiting example, the specified target geography may be a country, such as, for instance, the United States, or another country. In this example, the item recommendation application 121 identifies one or more geographic areas 151 that correspond to this target geography, such as, for instance, each state in the United States.

Having identified one or more geographic areas 151, the item recommendation application 121 then identifies one or more topics of interest 129 associated with the geographic areas 151. To do so, in one embodiment, the item recommendation application 121 may search the geographical areas 151 associated with each of the topics of interest 149 identified by the application 118. In another embodiment, the topics of interest 149 occurring within each geographic area 151 are stored on a map, in a look-up table, a database, on a calendar, and/or any other way. For instance, in the above example, the item recommendation application 121 may determine that the topics of interest 149 include, for example, the Presidential debate, the World Series, and/or other topics of interest 149 that are associated with the geographic areas 151 within the United States.

Figure 2:
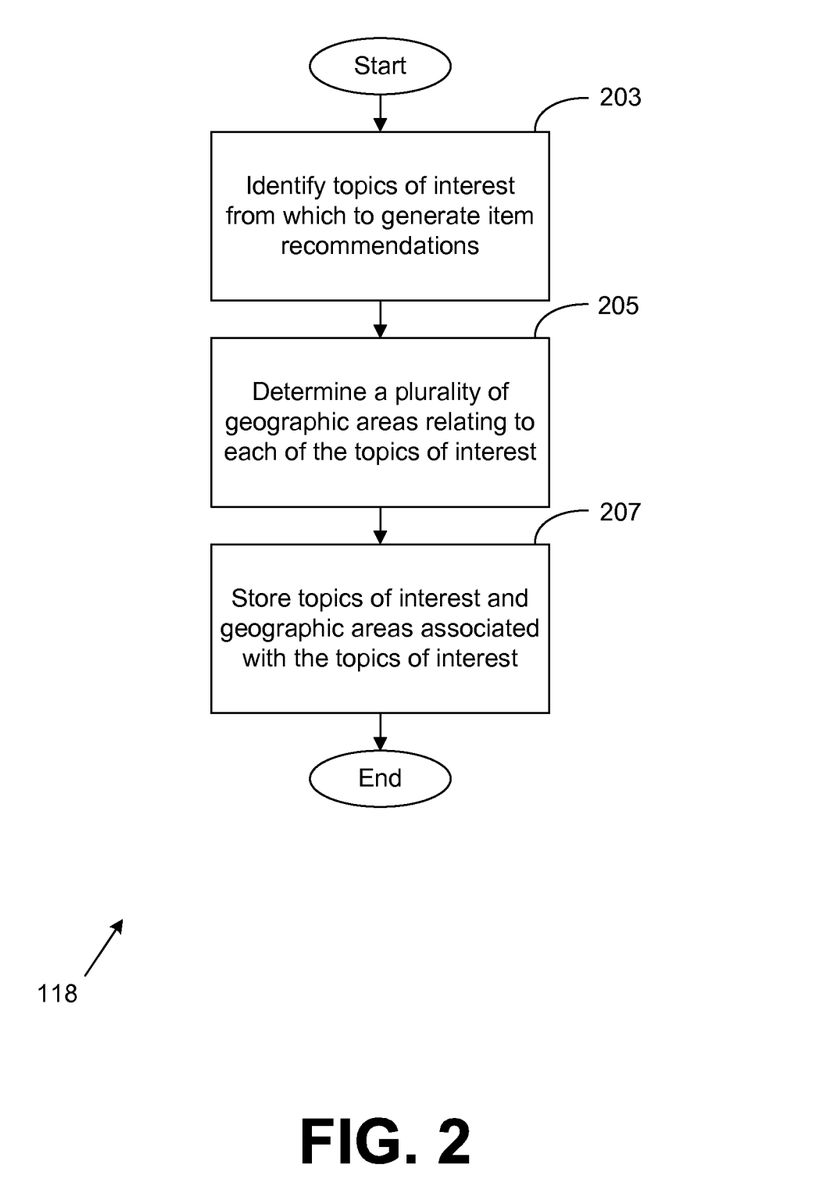
FIG. 2 is a flowchart illustrating an example of the functionality implemented as portions of an application executed in a computing device in the networked environment of FIG. 1 according to various embodiments of the present disclosure.

Upon identifying the topics of interest 149 associated with a target geography identified by a user, the item recommendation application 121 may generate and transmit a list of one or more topics of interest 149 identified by the application 118 that are associated with the identified geographical areas 151 to a user. The user of the client 106 may then request recommendations for one or more items 133 by selecting one of the topics of interest 129. Upon receiving the request, the item recommendation application 115 identifies one or more items 133 associated with the topic of interest 149 as described above Referring next to FIG. 2, shown is a flowchart that provides one example of the operation of a portion of the application 118 executed on the computing device 103 according to various embodiments. It is understood that the flowchart of FIG. 2 provides merely an example of the many different types of functional arrangements that may be employed to implement the operation of the portion of the application 118 as described herein. As an alternative, the flowchart of FIG. 2 may be viewed as depicting an example of the steps of a method implemented in the computing device 103 (FIG. 1) according to one or more embodiments.

According to one embodiment, the application 118 periodically, or in response to some other trigger, identifies one or more topics of interest 149 (FIG. 1) associated with a high level of public interest and/or one or more geographic areas 151 (FIG. 1) associated with each of the topics of interest 149. As described above, the item recommendation application 121 may recommend one or more items 133 associated with each of the topics of interest 149.

To this end, beginning at box 203, the application 118 identifies one or more topics of interest 149 for which to generate one or more item recommendations. The application 118 may then identify one or more topics of interest 149 using a variety of techniques. For example, the application 118 performs semantic analysis on the content of various network sites within a predetermined period of time and meeting a predefined threshold in order to identify one or more topics 149 as described above.

Next, at box 205, the application 118 identifies one or more geographical areas 151 that are associated with each of the topics of interest 149 identified in box 203. Lastly, in box 207, the application 118 stores each of the identified topics of interest 149 and the geographic areas 151 associated with each of the topics of interest 149 in data store 112 (FIG. 1). Thereafter, the portion of the application 118 ends.

Figure 3:
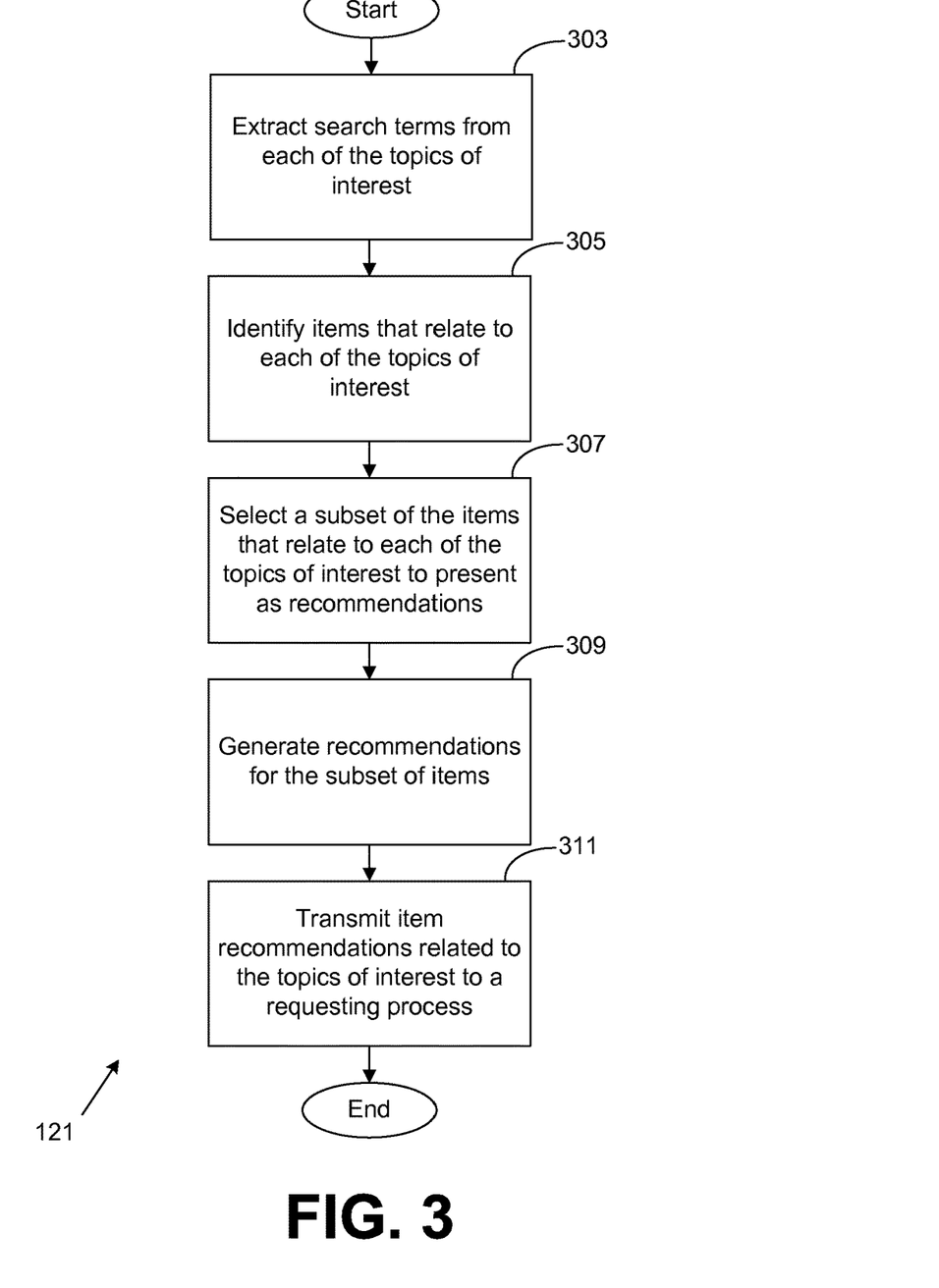
FIG. 3 is a flowchart illustrating an example of the functionality implemented as portions of an item recommendation application executed in a computing device in the networked environment of FIG. 1 according to various embodiments of the present disclosure.

Moving onto FIG. 3, shown is a flowchart that provides one example of the operation of a portion of the item recommendation application 121 executed on the computing device 103 according to various embodiments. It is understood that the flowchart of FIG. 3 provides merely an example of the many different types of functional arrangements that may be employed to implement the operation of the portion of the item recommendation application 121 as described herein. As an alternative, the flowchart of FIG. 3 may be viewed as depicting an example of the steps of a method implemented in the computing device 103 (FIG. 1) according to one or more embodiments.

According to one embodiment, the item recommendation application 121 generates recommendations for one or more items 133 (FIG. 1) based at least in part on one or more topics of interest 149 (FIG. 1) identified by the application 118 (FIG. 1). For example, the item recommendation application 121 may recommend items 133 related to the occurrence of one or more current events.

Beginning with box 303, in one embodiment, the item recommendation application 118 extracts one or more search terms associated with each of the topics of interest 149 identified by the application 118. Next, in box 305, the item recommendation application 121 identifies one or more items 133 that are related to each of the topics of interest 149. In one embodiment, the item recommendation application 121 may use the search terms that are associated with a topic of interest 149 to search item metadata 136 in order to identify correlations between an item 133 and a topic of interest 149. In another embodiment, the item recommendation application 121 may identify items 133 that are related to a topic of interest 149 from a listing, a database, a look-up table, a map, and/or any other data structure that indicates a correlation between an item 133 and a topic of interest 149.

Next, in box 307, the item recommendation application 121 selects a subset of the items 133 that are related to each of the topics of interest 149 to present as recommendations to one or more users based upon, for example, data associated with each of the items, information associated with one or more users, one or more scores generated for each of the items 133, and/or potentially other information. Thereafter, in box 309, the item recommendation application 121 generates recommendations for the subset of items 133 associated with a topic of interest 149. Lastly, in box 311, the item recommendation application 121 electronically provides the recommendations for the subset of items 133 to one or more users of the client 106 via email, text message, social networking message, or any other form of electronic communication as described above. Alternatively, the item recommendation application 121 may provide the recommendations for the subset of item 133 to a requesting process. Thereafter, the portion of the item recommendation application 121 ends.

Figure 4:
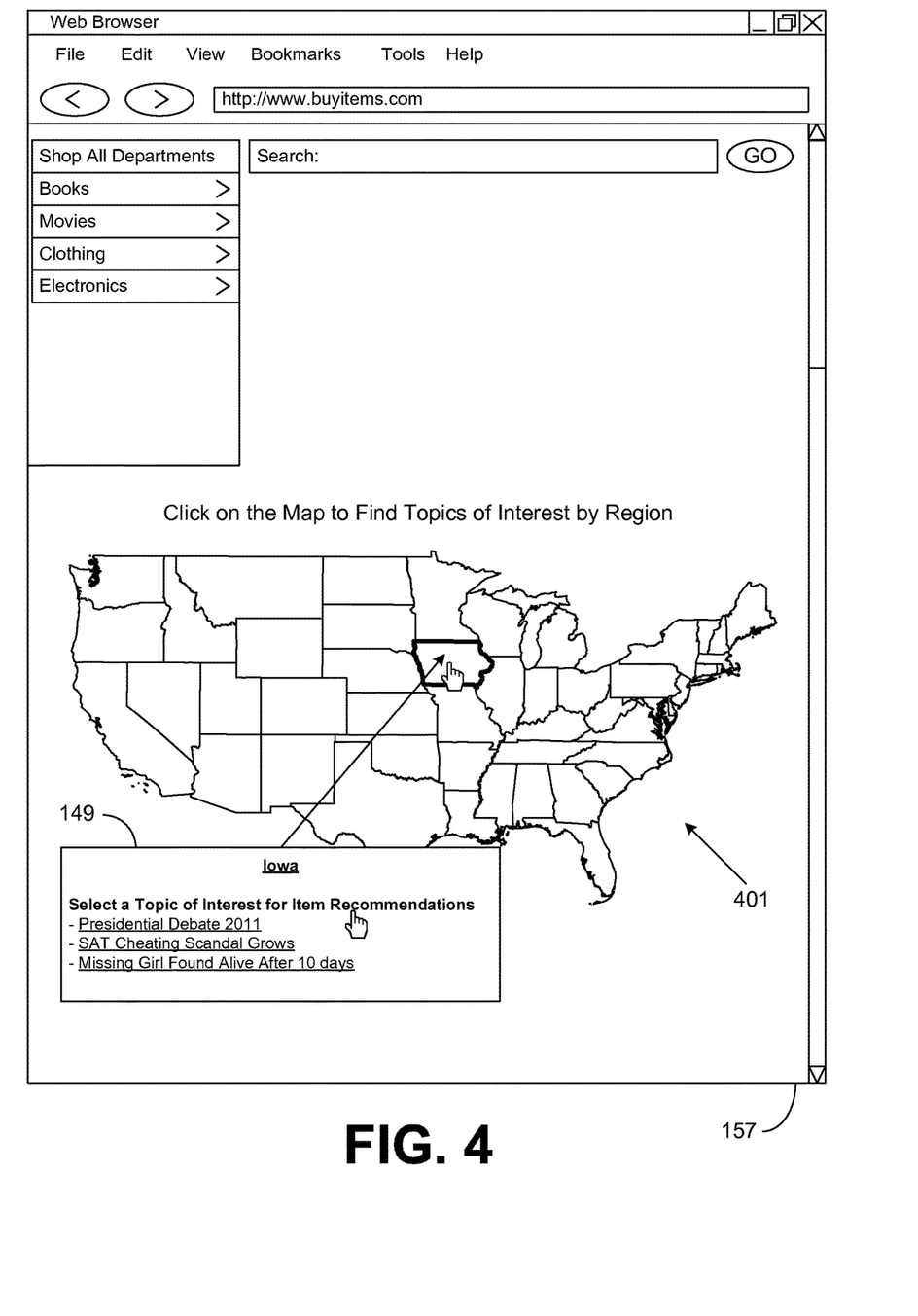
FIG. 4 is a drawing of an example of a network page rendered by a client in the networked environment of FIG. 1 according to various embodiments of the present disclosure.

Referring next to FIG. 4, shown is one example of a network page 157 rendered for display on the client 106 (FIG. 1) in the networked environment of FIG. 1. In one embodiment, the network page 157 may comprise a map in order for a user to identify a target geography and identify one or more topics of interest 149 associated with the target geography according to various embodiments of the present disclosure. The various graphical components such as blocks comprising different information shown in FIG. 4 are merely examples of the various types of features that may be used to accomplish specific functions noted. The network page 157 is rendered on a display device, or a dedicated application associated with the client 106 according to various embodiments.

In one embodiment, the item recommendation application 121 (FIG. 1) transmits a graphical representation of a map 401 for a user to identify a target geography. Upon selecting a target geography, the item recommendation application 121 may identify one or more topics of interest 149 associated with the geographic areas 151 (FIG. 1) within the target geography. The user may select a topic of interest 149 associated with the target geography. The item recommendation application 121 may then identify one or more items 133 (FIG. 1) related to the selected topic of interest 149 to present as recommendations to the user as described above. Alternatively, in one embodiment, the item recommendation application 121 filters other sources to identify the topics of interest 149 associated with the target geography.

Figure 5:
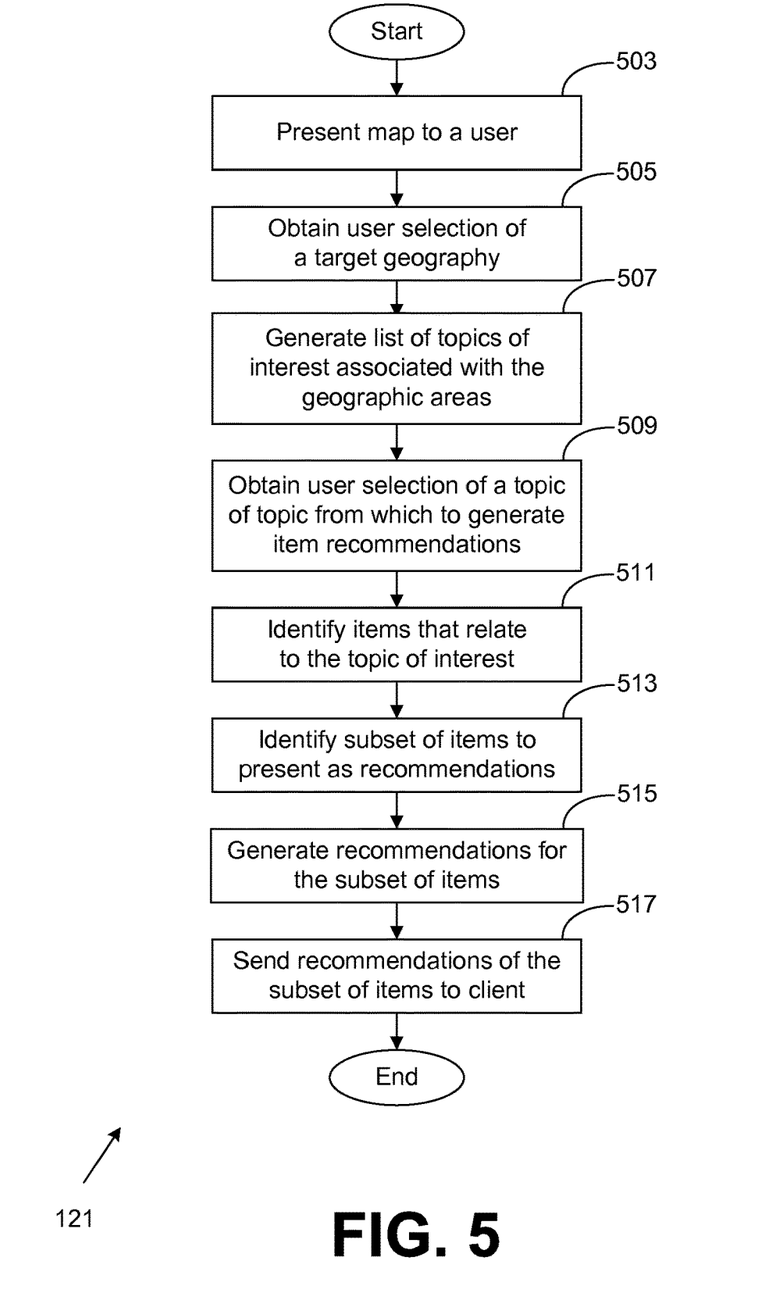
FIG. 5 is a flowchart illustrating another example of the functionality implemented as portions of an item recommendation application executed in a computing device in the networked environment of FIG. 1 according to various embodiments of the present disclosure.

Moving on to FIG. 5, shown is a flowchart that provides one example of the operation of a portion of the item recommendation application 121 executed on the computing device 103 according to various embodiments. It is understood that the flowchart of FIG. 5 provides merely an example of the many different types of functional arrangements that may be employed to implement the operation of the portion of the item recommendation application 121 as described herein. As an alternative, the flowchart of FIG. 5 may be viewed as depicting an example of the steps of a method implemented in the computing device 103 (FIG. 1) according to one or more embodiments.

Beginning with box 503, the item recommendation application 121 generates a map to present to a user. Next, in box 505, the item recommendation application 121 obtains a selection of a target geography. Thereafter, in box 507, the item recommendation application 121 generates a list of the topics of interest 149 (FIG. 1) associated with the geographic areas 151 (FIG. 1) in the target geography. Then, in box 509, the item recommendation application 121 obtains a user selection of one of the topics of interest 149 associated with the geographic areas 151. Subsequently, in box 511, the item recommendation application 121 identifies one or more items 133 (FIG. 1) associated with the topic of interest 149 selected by the user. Next, in box 513, the item recommendation application 121 selects a subset of the items 133 to present as recommendations. Then, in box 515, the item recommendation application 121 generates recommendations for the subset of items 133. Lastly, in box 517, the item recommendation application 121 provides the recommendations for the subset of items 133 to a requesting process or a user of the client 106 electronically via email, text message, as a network page, and/or any other form of electronic communication as can be appreciated. Thereafter, the portion of the item recommendation application 121 ends as shown.

Figure 6:
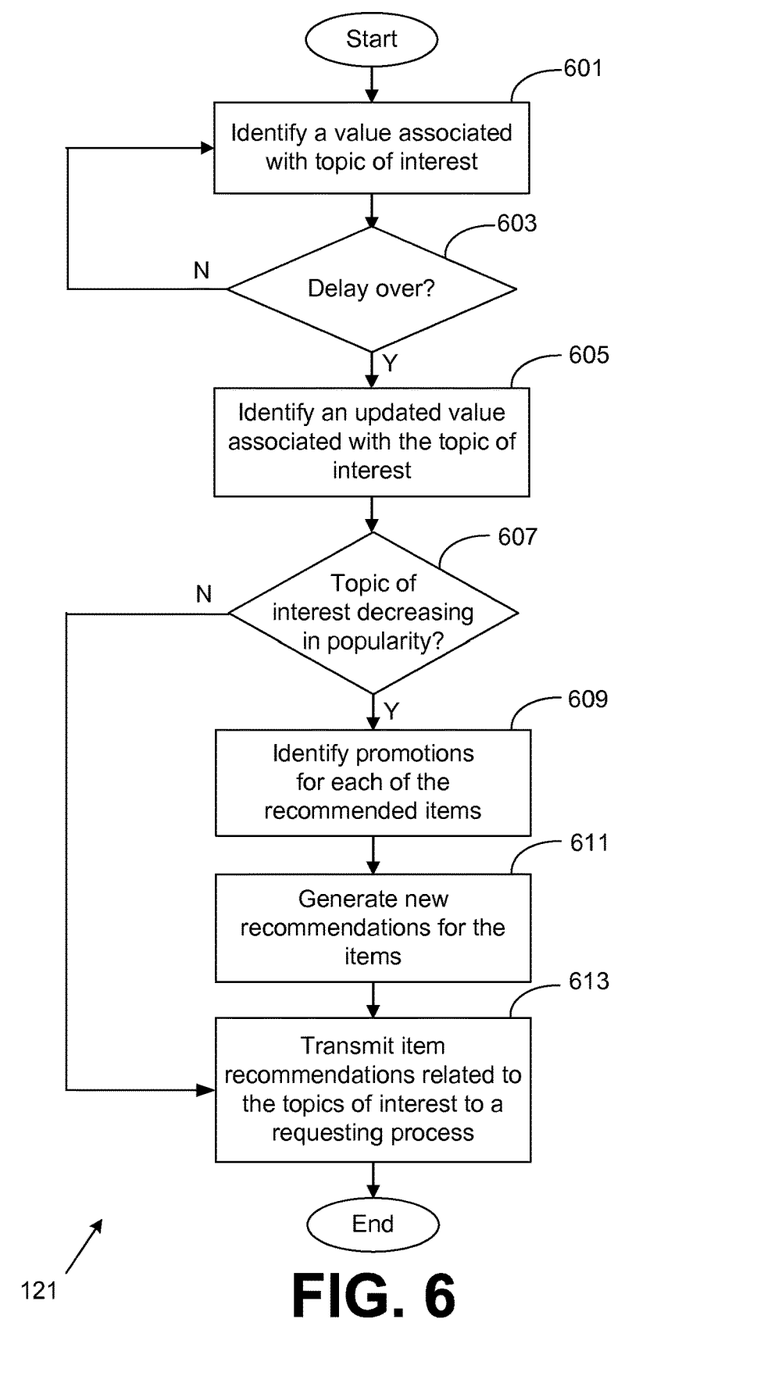
FIG. 6 is a flowchart illustrating another example of the functionality implemented as portions of the item recommendation application executed in a computing device in the networked environment of FIG. 1 according to various embodiments of the present disclosure.

Referring now on to FIG. 6, shown is a flowchart that provides one example of the operation of a portion of the item recommendation application 121 executed on the computing device 103 according to various embodiments. It is understood that the flowchart of FIG. 6 provides merely an example of the many different types of functional arrangements that may be employed to implement the operation of the portion of the item recommendation application 121 as described herein. As an alternative, the flowchart of FIG. 6 may be viewed as depicting an example of the steps of a method implemented in the computing device 103 (FIG. 1) according to one or more embodiments.

Beginning with box 601, the item recommendation application 121 identifies a value associated with a topic of interest 149 (FIG. 1). In one embodiment, the value may be computed using a variety of algorithms that identifies a quantifiable level of interest expressed by one or more users that relates to the topic of interest 149. Next, in box 603, the item recommendation application determines if a delay period has lapsed. If not, then the item recommendation application 121 returns to box 603. If so, then the item recommendation application 121 proceeds to box 605.

Assuming that the delay period is over, then in box 605 the item recommendation application 121 identifies an updated value associated with the topic of interest 149. The updated value may also be computed using a variety of algorithms that identifies a quantifiable level of interest expressed by one or more users that relates to the topic of interest 149 after the delay period as discussed in box 603 above.

Thereafter, in box 607, the item recommendation application 121 determines if the topic of interest 149 is decreasing or increasing in popularity. That is, the item recommendation application 121 may determine that a topic of interest 149 is increasing in popularity because user's expressions of interest relating to the topic of interest 149 are increasing over time. If so, the item recommendation application 121 ends as shown. Similarly, the item recommendation application 121 may determine that a topic of interest 149 is decreasing in popularity because user's expressions of interest that relates to the topic of interest 149 are decreasing over time. If so, then the item recommendation application 121 proceeds to box 609.

In one embodiment, the item recommendation application 121 may determine if a popularity of the topic of interest 149 is increasing or decreasing based at least upon the value and the updated value obtained in box 601 and 605 respectively. Using the example above, suppose that the value and the updated value comprise the number of times the topic of interest 149 appears in Twitter® postings. Further assume that the value is 10,000 and the updated value is 2,000. In this example, the item recommendation application 121 may determine that the topic of interest 149 is decreasing in popularity if because users are not posting as many Twitter® postings relating to the topic of interest 149.

Upon determining that the topic of interest 149 is decreasing in popularity, then in box 609, the item recommendation application 121 identifies one or more promotions associated with the items 133 that are currently being recommended to one or more users as discussed in FIG. 3. The promotions may be for example, decreasing the price of the items 133, offering free shipping of the items 133, and potentially other campaigns used to facilitate selling the items 133.

Thereafter, in box 611, the item recommendation application 121 generates new recommendations for the items 133 based upon the identified promotion. Lastly, in box 613, the item recommendation application 121 provides the new recommendations for the items 133 to a requesting process or a user of the client 106 electronically via email, text message, as a network page, and/or any other form of electronic communication as can be appreciated. Thereafter, the portion of the item recommendation application 121 ends as shown.

Figure 7:
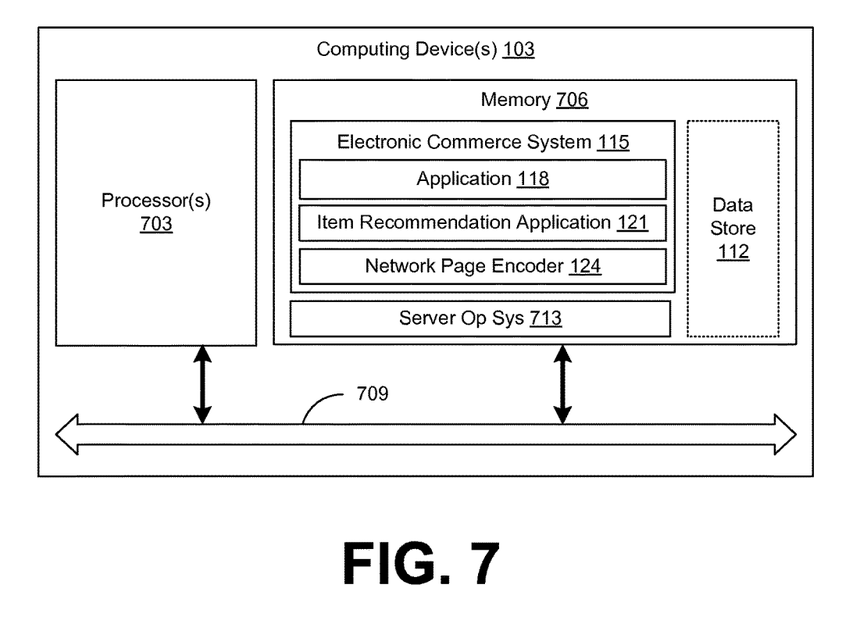
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are electronic commerce application 115, application 118, item recommendation application 121, network page encoder 124, and potentially other applications. Also stored in the memory 706 may be a data store 112 and other data. In addition, an operating system 713 may be stored in the memory 706 and executable by the processor 703.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network 109 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the electronic commerce system 115, application 118, item recommendation application 121, network page encoder 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2, 3, 5 and 6 shows the functionality and operation of an implementation of portions of the application 118 and item recommendation application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 2, 3, 5 and 6 show a specific order of execution, it is understood that the order of execution may differ from that which is depicted. For example, the order of execution of two or more blocks may be scrambled relative to the order shown. Also, two or more blocks shown in succession in FIGS. 2, 3, 5 and 6 may be executed concurrently or with partial concurrence. Further, in some embodiments, one or more of the blocks shown in FIGS. 2, 3, 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 115, the application 118, and the item recommendation application 121, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that identifies a topic of interest from activity on a social network site, wherein the topic of interest is associated with a geographic area;
   code that selects a plurality of items related to the topic of interest based at least in part on a correlation of keywords extracted from the activity on the social network site and the geographic area with a catalog of items;
   code that generates at least one recommendation to purchase at least one of the plurality of items; and
   code that provides the at least one recommendation to purchase the at least one of the plurality of items to a user.

2. The non-transitory computer-readable medium of claim 1, wherein the code that selects the plurality of items is further based at least in part on a purchase history associated with a user.

3. The non-transitory computer-readable medium of claim 1, wherein the program further comprises:
   code that identifies the geographic area based at least in part on keywords associated with the topic of interest.

4. A system, comprising:
   at least one computing device; and
   an application executable in the at least one computing device, the application comprising:
      logic that identifies a topic of interest from user activity on a network site;
      logic that identifies a plurality of search terms based at least in part on the topic of interest;
      logic that determines a plurality of correlations between the plurality of search terms and metadata associated with a plurality of items;
      logic that selects at least one of a subset of the plurality of items to recommend for purchase, wherein the subset of the plurality of items is based at least in part on the plurality of correlations; and
      logic that generates at least one recommendation to purchase the at least one of the subset of the plurality of items.

5. The system of claim 4, wherein the plurality of items are offered for sale through an electronic commerce system.

6. The system of claim 4, wherein the topic of interest is identified from a plurality of popular trends.

7. The system of claim 4, wherein the topics of interest are identified from content on the network site submitted by users of the network site.

8. The system of claim 4, wherein the logic that selects the at least one of the subset of the plurality of items to recommend for purchase is further based at least upon data associated with users of an electronic commerce system.

9. The system of claim 4, wherein the logic that selects the at least one of the subset of the plurality of items to recommend for purchase is further based at least upon data associated with individual ones of the subset of the plurality of the items.

10. The system of claim 4, further comprising logic that generates and selects a notification to at least one of the users, the notification including the at least one recommendation to purchase the at least one of the subset of the plurality of the items.

11. The system of claim 10, wherein the notification further comprises at least one of a text message, an email, a voicemail message, or an automated phone message.

12. The system of claim 10, wherein the notification further comprises a post of the at least one recommendation on one of a plurality of social networking sites.

13. The system of claim 4, wherein the application further comprises:
   logic that determines a plurality of secondary items having an affinity with the at least one of the subset of the plurality of items related to the plurality of the search terms associated with the topic of interest; and
   logic that recommends the plurality of secondary items to at least one user.

14. The system of claim 4, wherein the topic of interest is related to a geographic area associated with user activity on the network site.

15. A method comprising:
   generating, in a computing device, a first value associated with a topic of interest, wherein the first value represents a level of interest expressed by a plurality of users on a social network site and the first value is based at least in part on a first number of posts related to the topic of interest by the plurality of users to the social network site;
   generating, in the computing device, a second value associated with the topic of interest, the second value representing the level of interest expressed by the users on the social network site after a predetermined period of time after the generation of the first value and the second value is based at least in part on a second number of posts related to the topic of interest by the plurality of users to the social network site;
   determining, in the computing device, whether the level of interest associated with the topic of interest is decreasing based at least upon a comparison of the first value with the second value;
   identifying, in the computing device, a promotion associated with a plurality of items in response to a determination that the level of interest associated with the topic of interest is decreasing;

determining, in the computing device, at least one recommendation to purchase the at least one of the plurality of items based at least upon the promotion; and providing, in the computing device, a network page including the at least one recommendation to a user.

16. The method of claim 15, wherein the topic of interest is obtained by at least one user of the social network site selecting a target geography on a map, the topic of interest being associated with the target geography.

17. The method of claim 15, wherein the second value is below a threshold.

18. The method of claim 15, wherein the promotion comprises a decrease in price associated with the at least one item.

19. The method of claim 15, wherein the promotion comprises shipping the at least one item to the at least one of the users on the social network site for free.

20. The method of claim 15, wherein the topic of interest is identified from content on the social network site submitted by at least one of the plurality of users of the social network site.

* * * * *